United States Patent
Degani et al.

(10) Patent No.: US 10,692,252 B2
(45) Date of Patent: Jun. 23, 2020

(54) INTEGRATED INTERFACE FOR SITUATION AWARENESS INFORMATION ALERT, ADVISE, AND INFORM

(71) Applicant: GM GLOBAL TECHNOLOGY OPERATIONS LLC, Detroit, MI (US)

(72) Inventors: Asaf Degani, Tel Aviv (IL); Ido Zelman, Ra'Anana (IL); Yael Shmueli Friedland, Tel Aviv (IL); Mario Jodorkovsky, Nesher (IL); Michal Genussov, Tel Aviv (IL); Ariel Telpaz, Givat Haim Meuhad (IL)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 336 days.

(21) Appl. No.: 15/428,907

(22) Filed: Feb. 9, 2017

(65) Prior Publication Data
US 2018/0225964 A1  Aug. 9, 2018

(51) Int. Cl.
*G06T 11/20* (2006.01)
*G08G 1/16* (2006.01)

(52) U.S. Cl.
CPC ............ *G06T 11/206* (2013.01); *G08G 1/163* (2013.01); *G08G 1/166* (2013.01)

(58) Field of Classification Search
CPC . G06T 11/001; G06T 11/206; G06T 2210/56; G08G 1/09626
See application file for complete search history.

(56) References Cited

U.S. PATENT DOCUMENTS

| | | | |
|---|---|---|---|
| 2010/0324823 A1* | 12/2010 | Kobayashi | B60T 7/22 701/301 |
| 2013/0011013 A1* | 1/2013 | Takiguchi | G01C 21/3602 382/103 |
| 2015/0127217 A1* | 5/2015 | Lee | B60W 30/06 701/36 |
| 2016/0023352 A1* | 1/2016 | Kennedy | B25J 9/06 700/259 |
| 2016/0379366 A1* | 12/2016 | Shah | G06T 7/38 345/419 |
| 2017/0227647 A1* | 8/2017 | Baik | G01S 17/936 |
| 2018/0056990 A1* | 3/2018 | Elie | G06F 16/5854 |

* cited by examiner

*Primary Examiner* — Omer S Khan
(74) *Attorney, Agent, or Firm* — Lorenz & Kopf, LLP

(57) ABSTRACT

Systems and method are provided for generating an integrated interface in a vehicle. In one embodiment, a method includes: receiving data associated with an environment of the vehicle; encoding the environment data into a plurality of layers; extracting data from the plurality of layers into a point cloud; projecting the point cloud onto a meta-template defining a basic element and manipulable features of the basic element; and generating display data based on the projecting.

14 Claims, 6 Drawing Sheets

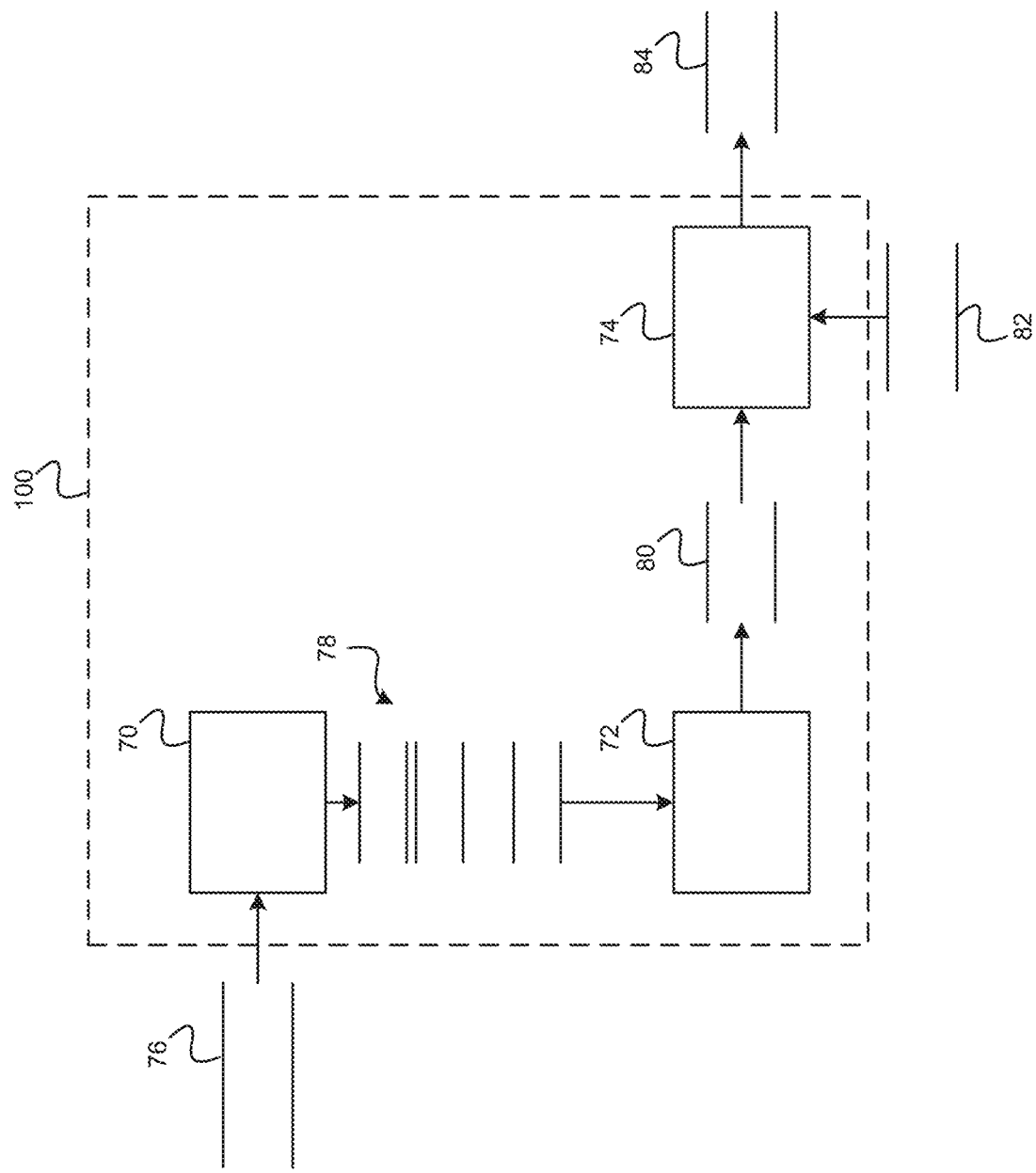

INTEGRATED INTERFACE FOR SITUATION AWARENESS INFORMATION ALERT, ADVISE, AND INFORM

The present disclosure generally relates to vehicles, and more particularly relates to systems and methods for presenting situation awareness information to occupants in a vehicle.

INTRODUCTION

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels. At any level, information obtained by the vehicle and relied upon to perform the autonomous control is not typically presented to a driver or passenger of the vehicle. Such information, referred to as situation awareness information, is defined as information associated with the perception of environmental elements with respect to time or space, the comprehension of their meaning, and the projection of their status after some variable has changed, such as time, or some other variable, such as a predetermined event.

If a driver or passenger were presented with situation awareness information they may be more comfortable riding in the autonomous vehicle. Accordingly, it is desirable to provide systems and methods that provide situation awareness information to occupants in a way that excites the human visceral processing system in an autonomous vehicle or other type of vehicle. It is further desirable to provide systems and methods that alert and warn an occupant about the situation around the vehicle and potential threats. It is further desirable to provide methods and systems that advise an occupant regarding the feasibility and probability of possible trajectories. It is still further desirable to provide methods and systems that inform occupants about trajectories taken. Furthermore, other desirable features and characteristics of the present invention will become apparent from the subsequent detailed description and the appended claims, taken in conjunction with the accompanying drawings and the foregoing technical field and background.

SUMMARY

Systems and method are provided for generating an integrated interface in a vehicle. In one embodiment, a method includes: receiving data associated with an environment of the vehicle; encoding the environment data into a plurality of layers; extracting data from the plurality of layers into a point cloud; projecting the point cloud onto a meta-template defining a basic element and manipulable features of the basic element; and generating display data based on the projecting.

BRIEF DESCRIPTION OF THE DRAWINGS

The exemplary embodiments will hereinafter be described in conjunction with the following drawing figures, wherein like numerals denote like elements, and wherein:

FIG. 6 is a dataflow diagram illustrating a controller of a situation awareness system, in accordance with various embodiments.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
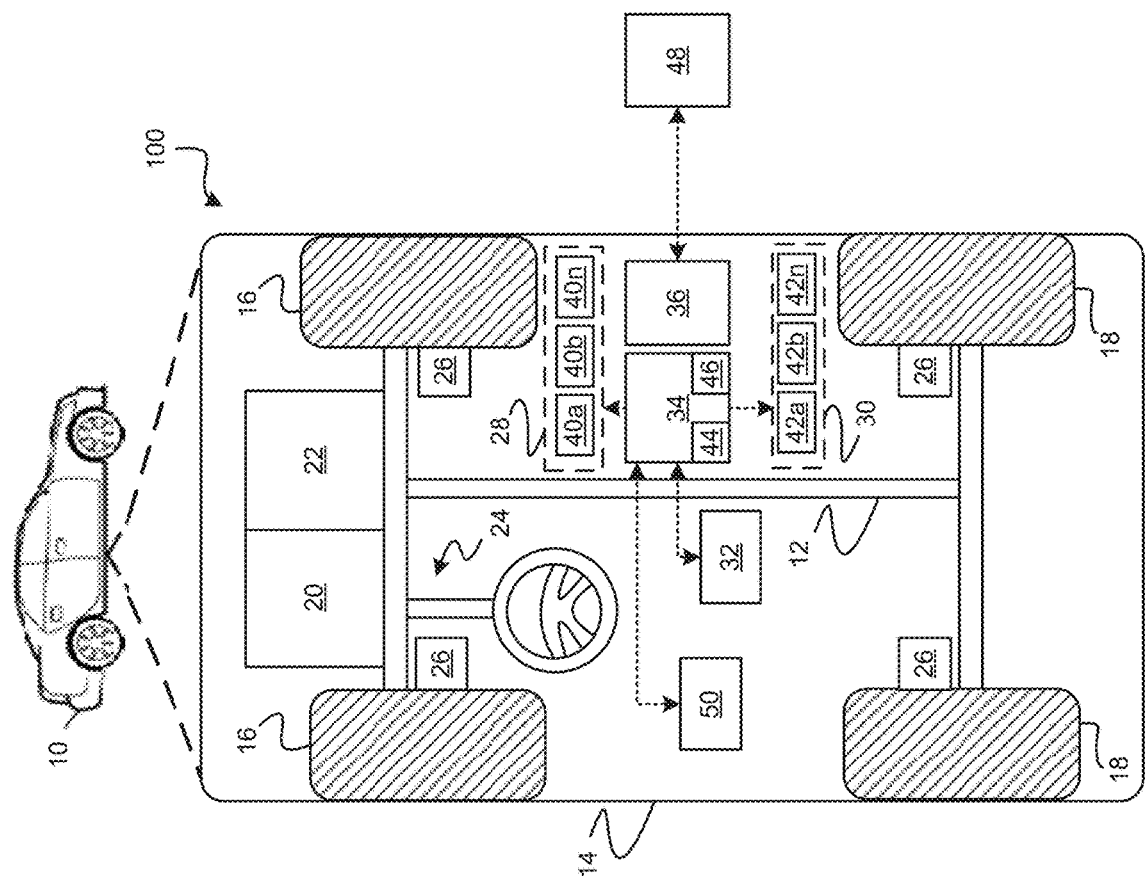
FIG. 1 is a functional block diagram illustrating an autonomous vehicle having a situation awareness information system, in accordance with various embodiments.

With reference to FIG. 1, a situation awareness information system shown generally at 100 is associated with a vehicle 10 in accordance with various embodiments. In general, the situation awareness system 100 selectively presents situation awareness information to occupants of a vehicle. The system selectively presents the information such that the occupant of the vehicle can process the information without overload.

As depicted in FIG. 1, the vehicle 10 is an automobile and generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the situation awareness information system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, public transportation, etc., can also be used. In an exemplary embodiment, the autonomous vehicle 10 is a so-called Level Four or Level Five automation system although the present disclosure may be implemented for any level of automation. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
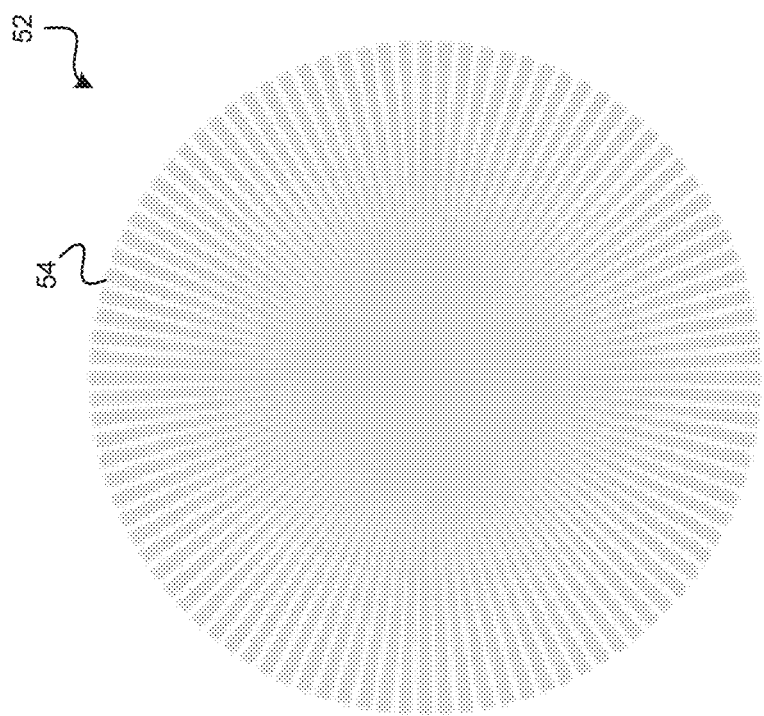

The communication system 36 is configured to wirelessly communicate information to and from other entities 48, such as but not limited to, other vehicles ("V2V" communication) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the situation awareness information system 100 and, when executed by the processor 44, cause situation awareness information to be selectively presented to an occupant of the vehicle 10 in a manner that does not overload the occupant. For example, environment information is processed to selectively present certain situation awareness information in an integrated and holistic interface 50; and the environment information is processed to selectively present the situation awareness information in the integrated interface 50 in a consistent manner for any use case scenario (e.g., as presented in an uncertain an dynamic environment).

In various embodiments, the integrated interface 50 includes an ego-centric representation of the host vehicle and regions of operation around the representation. For example, the ego-centric representation can be in the form of one or more basic elements such as a circle, a square, a rectangle, an octagon, a hexagon, etc. the represents the vehicle 10. The basic element includes features that are manipulable (shaped or distorted) to illustrate elements of the exterior environment of the vehicle 10. The features can be manipulated based on a mapping to a cloud of potential points that represent anything that can influence on the decisions that the automated system makes.

In various embodiments, the influence may be either positive or negative. For example, center of lanes are sampled into positive points that attracts the host vehicle, and road boundaries are sampled into negative points that repel the host vehicle. Similarly, other obstacles can be represented by negative points. And there may be other considerations such as, but not limited to, time, gasoline consumption, aggressive-defensive driving behavior that can all be represented by appropriate potential points with an associated weight (that can take any positive or negative value). At any time point, just after all the relevant potential points are assigned around the host vehicle, a physical equation calculates the overall impact of all the potential points around the host vehicle allowing for the shaping or distortion.

Figure 3:
FIGS. 2 and 3 illustrate elements of an integrated interface of the situation awareness information system, in accordance with various embodiments.

In various embodiments, as shown in FIG. 2, the basic element 52 can include a circle. The circle can include a three hundred sixty degree radial-based visual display representation. For example, the circle (or other shape) can include n bars 54 that originate from the shape's center and that extend radially outward. As shown in FIG. 3, each bar 54 can include m cells or fragments 56. Each bar 54 and/or cell 56 can be associated with one or more parameters including, but not limited to, length, width, depth, color, pattern, and transparency. The value of the parameters can be changed dynamically with time so that the visual characteristics presented to the user can change smoothly or radically within fragments of a second, depending on the surrounding environment. The values of the parameters can be associated with the environment, such as, basic elements of information, alerts, advisements, and/or physical effects; and as the values associated with the environment change (e.g., the positive or negative value), so does the value of the associated parameter; thus causing the change in appearance of the basic element 52.

For example, changing a value of the length or the width of a bar 54 or a cell 56 may change the geometry of the overall basic element 52 to illustrate a value of a force such as a detected object acting on or that may act on the vehicle 10. In another example, changing a value of the length or width may change a size of the basic element 52 to illustrate a value of a speed or other forces of the vehicle 10. In another example, changing a value of the pattern may change a connectivity of an outline to illustrate a value of danger to the vehicle 10. In another example, changing a value of the color may change a color of the basic element 52 to illustrate a threat level. In another example, changing a value of transparency may change a color saturation or transparency to illustrate a value of probability of an action. As can be appreciate, the parameters and associations are merely exemplary as any number of parameters can be associated with a variety of information in various embodiments.

Figure 4A:
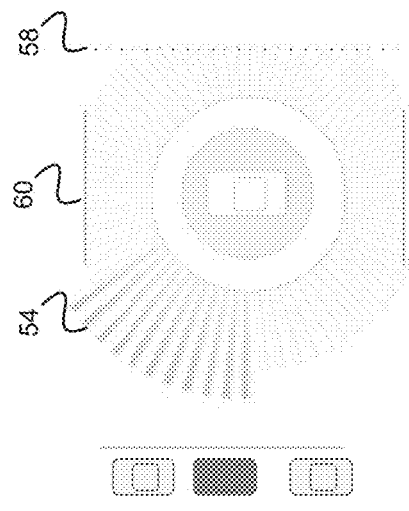
FIGS. 4A-4F are illustrations of an integrated interface of the situation awareness information system in relation to environmental scenarios, in accordance with various embodiments.

With reference now to FIGS. 4A-4F, illustrations provide example use case scenarios for changing the parameters based on certain received information. FIG. 4A illustrates light, partially transparent, green (or other color) bars 54 that are used to express the potential for movement of a parked vehicle. The fragmentation of the bars supports a dynamic fill of color so as to provide smooth animation for non-urgent situations or a harsh fast dynamic effect for urgent ones. FIG. 4A illustrates an expression 58 of a sidewalk with a dashed line on the right and an expression 60 of parked cars with a solid line in the front and in the back.

Figure 4B:
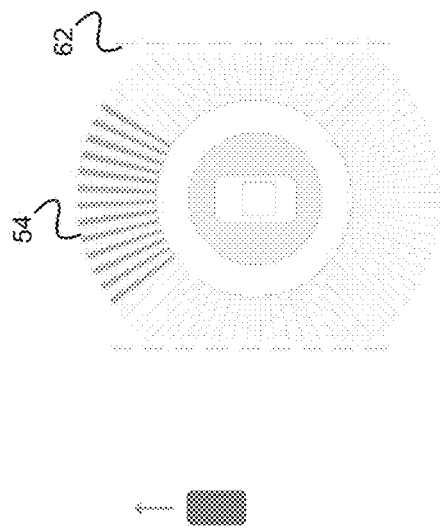

FIG. 4B illustrates dark, solid green bars 54 that are used to indicate actual movement of the vehicle as it is driving straight forward. The lanes can be represented by dashed lines 62 that truncate the side bars 54 or altering the length parameter of the bars 54.

Figure 4C:
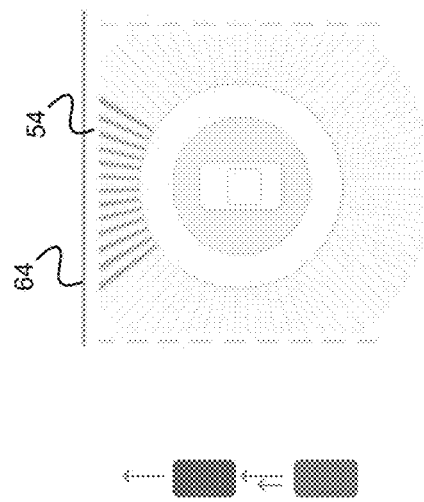
Figure 4D:
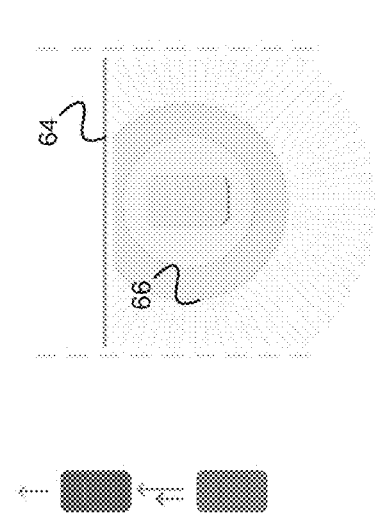
Figure 4E:
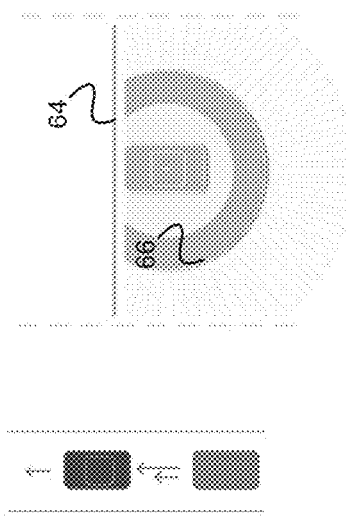

FIG. 4C illustrates an object detected in front of the vehicle as a solid line with white borders as shown at 64. The solid line 64 truncates the front bars 54 illustrating the actual movement of the vehicle. FIG. 4D illustrates a semi-transparent, red (or other color) circle 66, that serves as a safety zone or shield around the vehicle. The color change is due to the solid line 64 crossing an outer boundary of the shield. FIG. 4E illustrates the circle 66 as a red (or other color) and non-transparent, that serves as a safety zone or shield around the vehicle. The transparency change is due to the solid line 64 crossing an inner boundary of the shield.

Figure 4F:
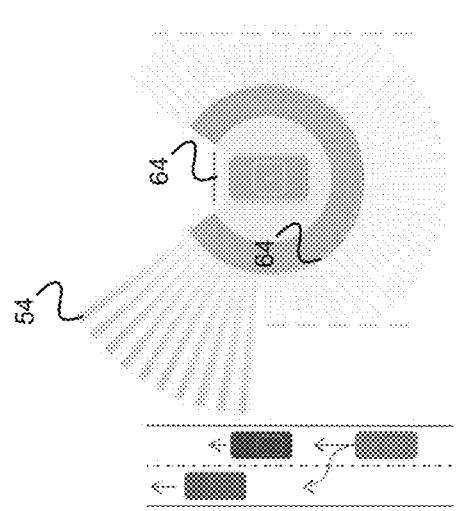

FIG. 4F illustrates the circle 66 in red (or other color) and non-transparent, that serves as a safety zone or shield around the vehicle along with light, partially transparent, green (or other color) bars 54 that are used to express the potential for movement of the traveling vehicle. The transparency and color change of the circle 64 is sued to express the solid line crossing an inner boundary of the shield.

As can be appreciated, FIGS. 2, 3, and 4A-4F are some exemplary embodiments. In various embodiments, the integrated interface 50 of FIG. 1 can include any number of embodiments. For example, as shown in more detail FIG.

Figure 5B:
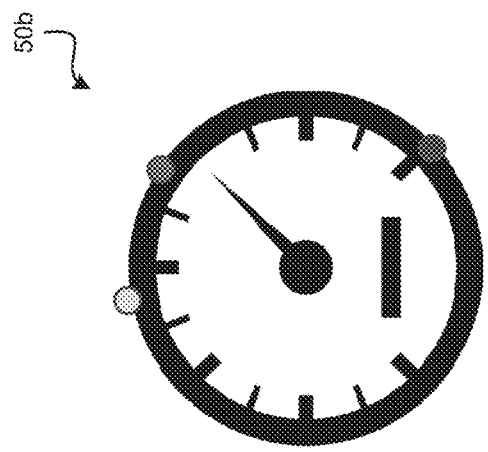
FIGS. 5A-5C are illustrations of an integrated interfaces of the situation awareness information system, in accordance with various embodiments.
Figure 5C:
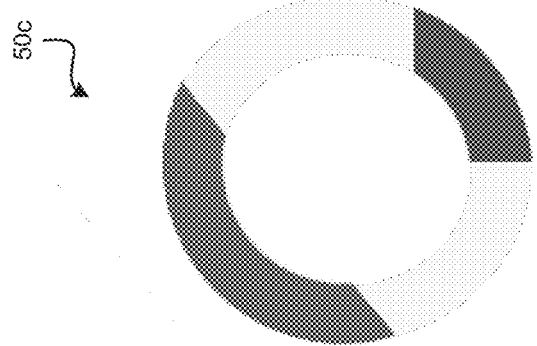
Figure 5A:
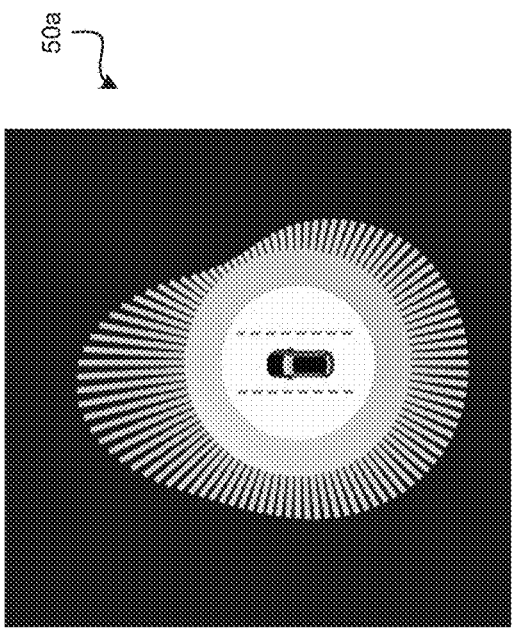

5A, an integrated interface 50a can include three or more circles: two of which form a thick circle (with an inner and an outer line) referred to as the shield. The third-external circle consists of n bars and n active points. In another example, as shown in FIG. 5B, an integrated interface 50b can include events that are represented by the location, color, and size of dots (or other image) relative to the basic element. In still another example, an integrated interface 50c can include events represented by the location, color, and size of the circle components.

Referring now to FIG. 6, and with continued reference to FIG. 1, a dataflow diagram illustrates various embodiments of the information awareness system 100 which may be embedded within the controller 34. Various embodiments of the information awareness system 100 according to the present disclosure can include any number of sub-modules embedded within the controller 34. As can be appreciated, the sub-modules shown in FIG. 6 can be combined and/or further partitioned to similarly present situation awareness information to a user in an integrated form such as according to one or more of the forms shown in FIGS. 2, 3, 4A-4F, and 5A-5C. Inputs to the situation awareness system 100 may be received from the sensor system 28, received from other control modules (not shown) associated with the autonomous vehicle 10, received from the communication system 36, and/or determined/modeled by other sub-modules (not shown) within the controller 34.

In various embodiments, the information awareness system 100 includes an encoder module 70, an extraction module 72, and a projection module 74. The functions of the modules 70-74 are performed continuously on received information to shape the display according to the dynamically changing environment.

For example, the encoder module 70 receives sensed or perceived data 76 associated with the exterior environment of the vehicle and encodes the sensed or perceived information into layers 78 that represent driving objectives and constraints. The layers 78 may include, for example, a geometry layer, a kinematic layer, a safety layer, object meaning layer, etc. The geometry layer encodes, for example, road geometry (i.e., road boundaries, intersection structures, etc.). The kinematic layer, for example, encodes the vehicle's kinematics and dynamic state and ability (i.e., the vehicle's momentum, the vehicle's kinematic envelope, etc.). The safety layer, for example, encodes surrounding obstacles (i.e., other vehicles, pedestrians, etc.) The encoding can be implicit representations and/or explicit representations of the objects. The object meaning layer, for example, encodes meanings and/or importance levels of objects.

The extraction module 72 receives the layers 78 and extracts data from the layers 78 to a cloud of spatio-temporal potential points (i.e., that have an effect on the vehicle) 80. For example, the data from the layers 78 are extracted to the spatio-temporal cloud of potential points where each point has a position and a time with respect to the host vehicle. The data can include all of the data from the layer or a selected some of the data. For example, the data can include a potential weight that reflects its positive (attraction) or negative (repulsion) quality of an object.

The projection module 74 receives the cloud of points 80 and a meta-template or templates 82 of a basic element having manipulable features (e.g., as discussed above) and projects the potential field defined by the cloud of potential points on the meta-template(s) of the display design. For example, when the data includes a weight reflecting an attraction, a force field analysis is performed that is a physical-based analysis that uses the forces derived from the cloud of potential points in order to shape (e.g., adjust the length and/or width parameters) a quasi-static instance of the display as defined by the meta-template(s) 82. As can be appreciated, other data can be analyzed to cause changes in other parameters of the meta-template(s) 82 as this is merely an example.

The projection module 74 then generates display data 84 to display the projection of the cloud of points 80 onto the meta-template on a display in the vehicle for viewing by an occupant.

Figure 7:
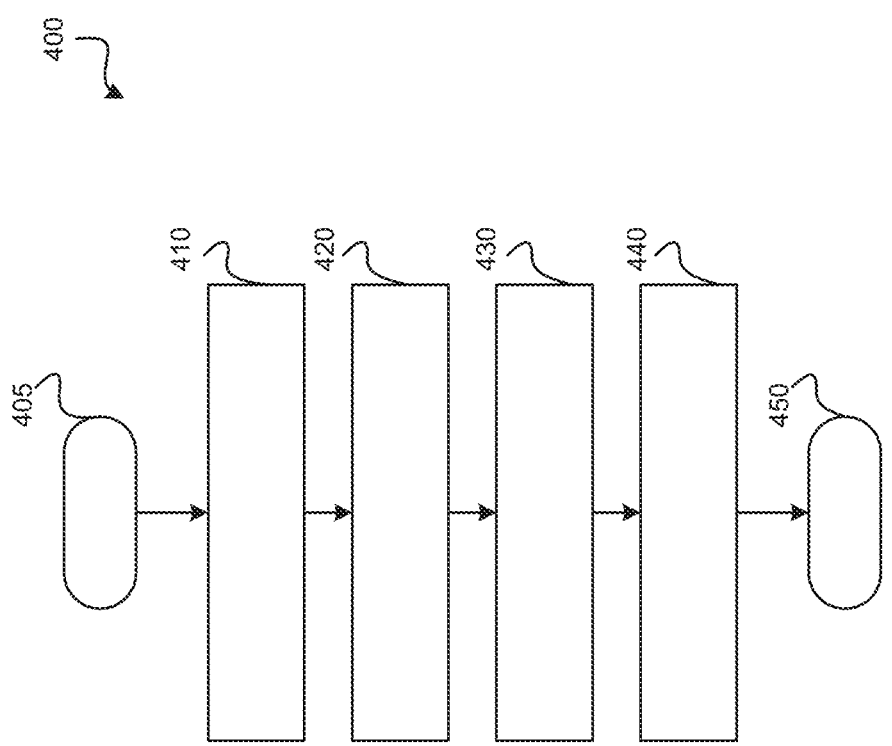
FIG. 7 is a flowchart illustrating a control method for providing situation awareness information, in accordance with various embodiments.

Referring now to FIG. 7, and with continued reference to FIGS. 1 and 6, a flowchart illustrates a control method 400 that can be performed by the situation awareness system of FIGS. 1 and 6 in accordance with the present disclosure. As can be appreciated in light of the disclosure, the order of operation within the method is not limited to the sequential execution as illustrated in FIG. 7, but may be performed in one or more varying orders as applicable and in accordance with the present disclosure. In various embodiments, the method 400 can be scheduled to run based on one or more predetermined events, and/or can run continuously during operation of the autonomous vehicle 10.

In various embodiments, the method 400 may begin at 405. The sensed and/or perceived environment data 76 is received at 410. The environment data 76 is then processed at 420 and extracted into layers 78. The layers 78 are then extracted into a point cloud 80 at 430. The point cloud 80 is then projected onto the meta-template(s) 82 at 440 and display data 84 is generated. Thereafter, the method may end at 450.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of generating an integrated interface in a vehicle, comprising:

receiving data associated with an environment of the vehicle;

encoding the environment data into a plurality of layers, the plurality of layers including a geometry layer, a kinematic layer, a safety layer, and an object meaning layer;

extracting data from the plurality of layers into a point cloud including a plurality of points, wherein one or more points of the plurality of points includes an attraction value that is assigned at least one of a positive weight and a negative weight based on the environment data associated with the plurality of layers;

projecting the point cloud onto a meta-template, wherein the meta-template includes a basic shape having manipulable features that extend radially outward from the shape, the manipulable features are manipulable in at least one of a length, a width, a depth, and a pattern based on the attraction value of the one or more points of the point cloud; and generating display data based on the projecting.

2. The method of claim 1, wherein the point cloud is a spatio-temporal point cloud.

3. The method of claim 1, wherein the basic element is a circle and wherein the manipulable features include n bars that originate from a center of the circle and that extend radially outward in three hundred sixty degrees.

4. The method of claim 3, wherein each bar includes at least one manipulable parameter.

5. The method of claim 4, wherein each manipulable parameter is associated with at least one of basic elements of information of the environment, alerts of the environment, advisements of the environment, and physical effects of the environment.

6. The method of claim 4, wherein the at least one manipulable parameter includes at least one of a length, a width, a depth, a pattern, and a transparency.

7. The method of claim 3, wherein the n bars each include m cells.

8. The method of claim 7, wherein each cell includes at least one manipulable parameter.

9. The method of claim 8, wherein the at least one manipulable parameter includes at least one of a length, a width, a depth, a pattern, and a transparency.

10. The method of claim 8, wherein each manipulable parameter is associated with at least one of basic elements of information of the environment, alerts of the environment, advisements of the environment, and physical effects of the environment.

11. The method of claim 1, wherein the basic element is at least one circle and wherein the manipulable features include a three hundred sixty degree radial-based visual display representation extending from the at least one circle.

12. A vehicle, comprising:
at least one sensor that provides sensor data associated with an environment of the vehicle; and
a controller that, by a processor and based on the sensor data, encodes the environment data into a plurality of layers, the plurality of layers including a geometry layer, a kinematic layer, a safety layer, and an object meaning layer, extracts data from the plurality of layers into a point cloud including a plurality of points, wherein one or more points of the plurality of points includes an attraction value that is assigned at least one of a positive weight and a negative weight based on an attraction quality determined from the environment data associated with the plurality of layers, projects the point cloud onto a meta-template, and generates display data for display on a display of the vehicle based on the projecting, wherein the meta-template includes a basic shape having manipulable features that extend radially outward from the shape, the manipulable features are manipulable in at least one of a length, a width, a depth, and a pattern based on attraction value of the one or more points of the point cloud.

13. The vehicle of claim 12, wherein the point cloud is a spatio-temporal point cloud with respect to the vehicle.

14. The vehicle of claim 12, wherein the manipulable features represent basic elements of information of the environment, alerts of the environment, advisements of the environment, and physical effects of the environment.

* * * * *